United States Patent [19]

Permuy

[11] Patent Number: 5,784,270
[45] Date of Patent: Jul. 21, 1998

[54] METHOD OF CONTROLLING AN H-BRIDGE

[75] Inventor: Alfred Permuy, Reuil Malmaison, France

[73] Assignee: Valeo Electronique, Rueil Malmaison, France

[21] Appl. No.: 777,233

[22] Filed: Dec. 30, 1996

[30] Foreign Application Priority Data

Dec. 29, 1995 [FR] France ............... 95 15728

[51] Int. Cl.⁶ ...................................... H02M 7/5387
[52] U.S. Cl. .......................................... 363/132
[58] Field of Search ........................ 363/16, 17, 97, 363/98, 131, 132

[56] References Cited

U.S. PATENT DOCUMENTS

| | | | |
|---|---|---|---|
| 4,710,686 | 12/1987 | Guzik | 318/293 |
| 4,879,641 | 11/1989 | Rossi et al. | 363/98 |
| 4,937,725 | 6/1990 | Dhyanchand et al. | 363/132 |
| 5,111,378 | 5/1992 | Novak et al. | 363/98 |
| 5,365,422 | 11/1994 | Close et al. | 363/98 |
| 5,379,209 | 1/1995 | Goff | 363/132 |
| 5,530,639 | 6/1996 | Schulz et al. | 363/17 |

FOREIGN PATENT DOCUMENTS

| | | |
|---|---|---|
| 0 259 005 A1 | 3/1988 | European Pat. Off. |
| 0 613 235 A1 | 8/1994 | European Pat. Off. |

*Primary Examiner*—Matthew V. Nguyen
*Attorney, Agent, or Firm*—McCormick, Paulding & Huber

[57] ABSTRACT

Controlling an H-bridge of switches, characterized in that during a cycle, the current takes a peak value of constant sign during a continuous portion corresponding to a cycle fraction equal to $|<V>/U|$, where $<V>$ is the mean voltage applied to the load and U is the voltage of the DC voltage source, said portion being preceded by a cycle portion corresponding to a cycle fraction equal to $\frac{1}{2}(1-|<V>/U|)$ during which the two switches (I1, I2) of the H-bridge which are connected to ground are closed (or open as the case may be), and followed by a cycle portion likewise corresponding to a cycle fraction equal to $\frac{1}{2}(1-|<V>/U|)$ during which the two switches (I1, I2) of the H-bridge which are connected to ground are open (or closed as the case may be).

3 Claims, 3 Drawing Sheets

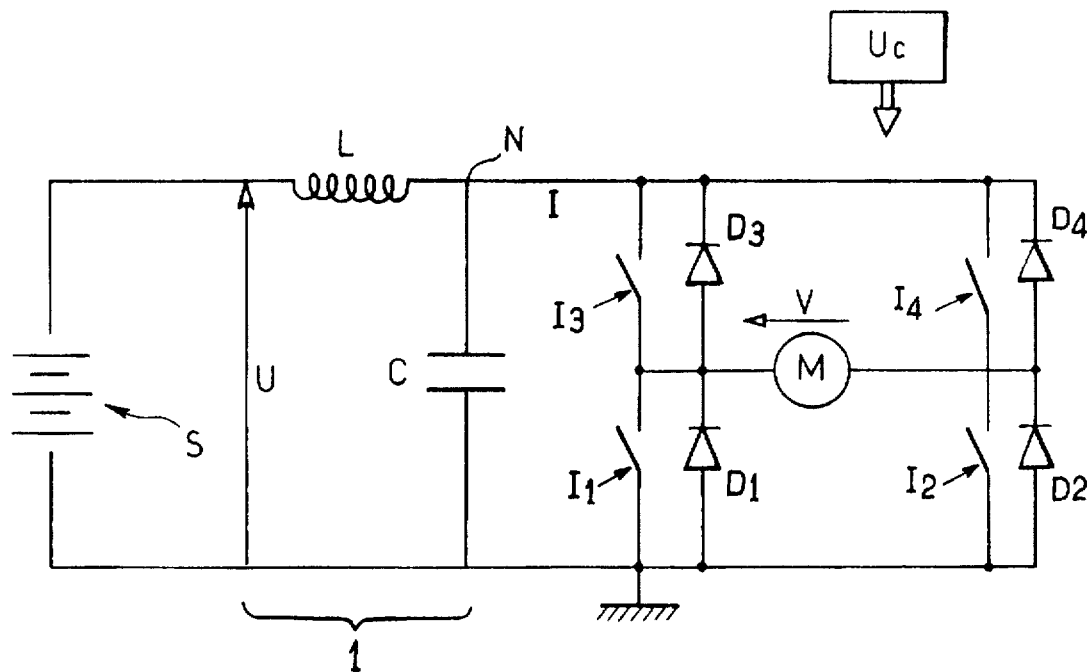
FIG.1
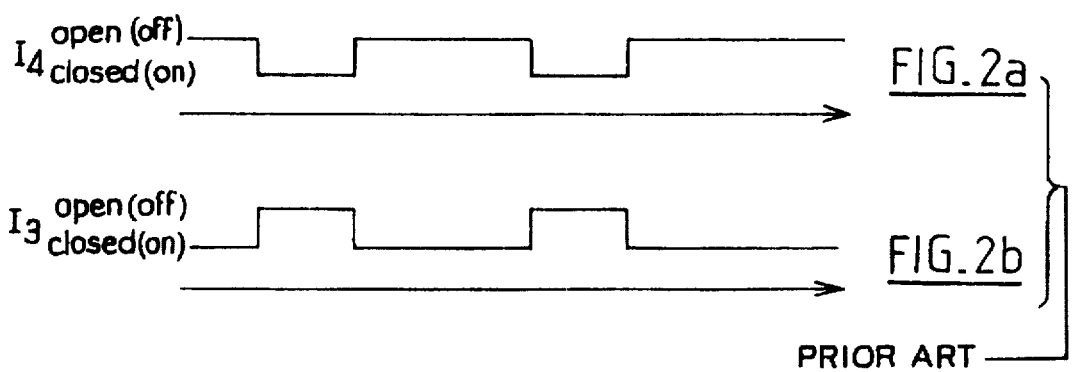
FIG.2a
FIG.2b
PRIOR ART

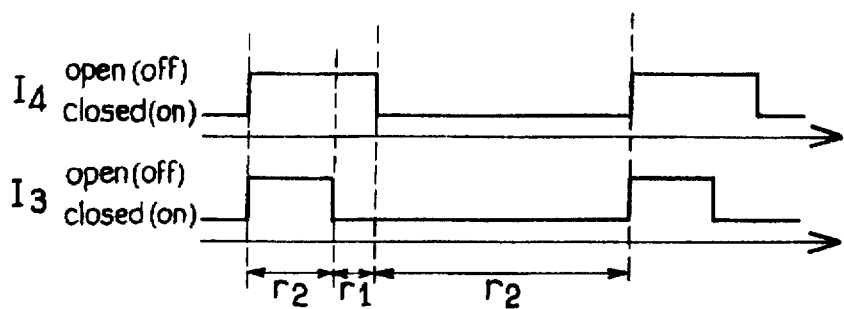
FIG. 3a
FIG. 3b
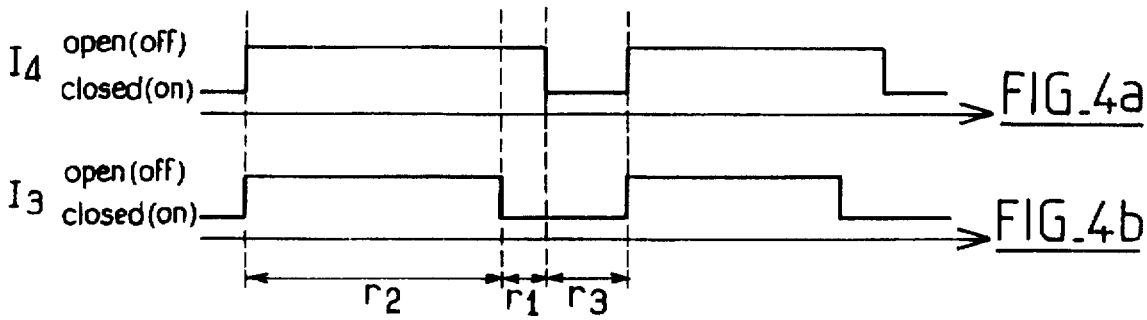
FIG. 4a
FIG. 4b
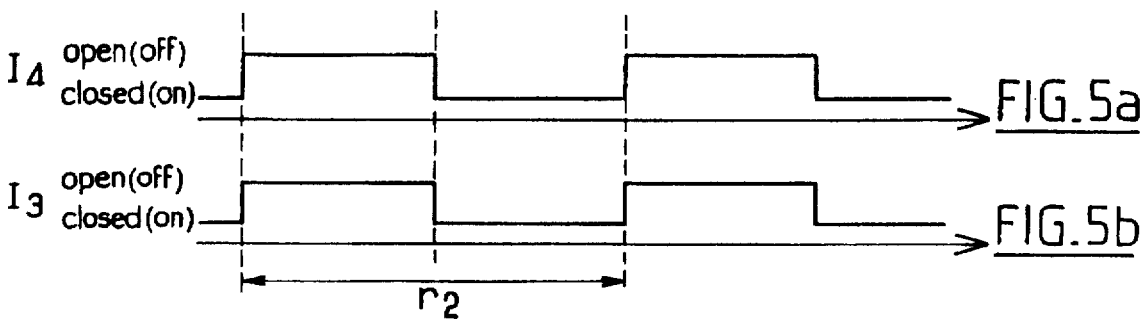
FIG. 5a
FIG. 5b
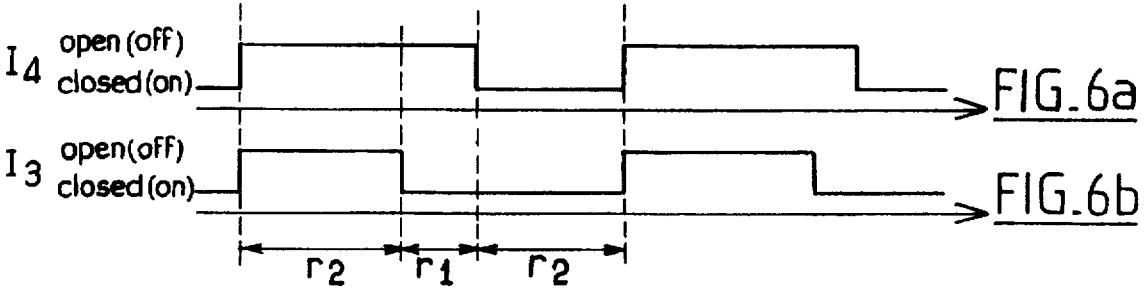
FIG. 6a
FIG. 6b
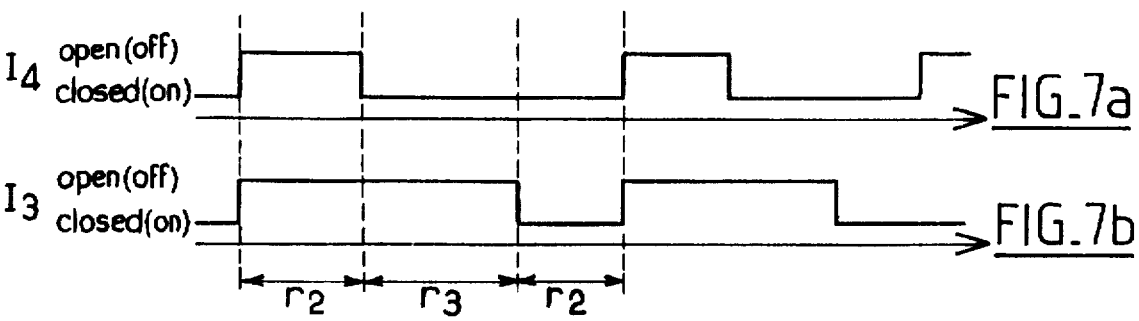
FIG. 7a
FIG. 7b

METHOD OF CONTROLLING AN H-BRIDGE

The present invention relates to a method of controlling an H-bridge for regulating an inductive load by pulse width modulation.

The invention also relates to a power supply circuit including such a regulator bridge.

By way of example, such a circuit is used for regulating a two-phase load, such as an electric motor used in a motor vehicle, e.g. for adjusting seats, controlling windows, etc.

The regulation bridge of such a circuit is conventionally powered by a DC source, such as the vehicle battery. The voltage delivered by the source is chopped in time using a pulse width modulation method so as to modify the mean value of the current flowing through the load. At the chopper frequency, the load is essentially of an inductive nature. Consequently, when the term "mean value" is used for voltages or currents, it must be understood that the mean is a time mean taken over a plurality of chopper periods. To smooth variations in the current delivered by the source, a capacitor is mounted in parallel between the two ends of the bridge.

Unfortunately, such a smoothing capacitor is quite bulky and, correspondingly, of non-negligible cost.

Proposals have already been made, in particular in U.S. Pat. No. 5,365,422 to actuate the switches of the H-bridge using sequences that are selected so as to minimize the rms current passing through the capacitive means mounted between the ends of the bridge.

That makes it possible to reduce the size of the smoothing capacitors of bridges that perform load regulation by pulse width modulation.

The size and the cost of a capacitor depend to a very large extent on the rms current flowing through it.

By minimizing the rms current passing through the capacitive means connected in parallel with the regulation bridge, the control sequences of the circuit proposed by the present invention make it possible to reduce the size, and thus the cost, of said capacitive means.

An object of the invention is to propose an actuation sequence that makes it possible to balance the conduction times of the various switches in the bridge.

According to the invention, this object is achieved in that the method of controlling an H-bridge of switches for regulating a load by pulse width modulation, said bridge being powered by a DC voltage source, smoothing capacitive means being connected between the ends of said bridge, and the sequences whereby the switches of said bridge are actuated being selected to minimize the rms voltage flowing through said capacitive means, is characterized in that during a cycle, the current takes a peak value of constant sign during a continuous portion corresponding to a cycle fraction equal to |<V>/U|, where <V> is the mean voltage applied to the load and U is the voltage of the DC voltage source, said portion being preceded by a cycle portion corresponding to a cycle fraction equal to ½(1–|<V>/U|) during which the two switches of the H-bridge which are connected to ground are closed [or open as the case may be], and followed by a cycle portion likewise corresponding to a cycle fraction equal to ½(1–|<V>/U|) during which the two switches of the H-bridge which are connected to ground are open (or closed as the case may be).

Other characteristics and advantages of the invention appear further from the following description. This description is purely illustrative and non-limiting. It should be read with reference to the accompanying drawings, in which:

FIG. 1 is a diagram of an H-bridge power supply circuit;

FIGS. 2a & 2b show how the switches of the FIG. 1 H-bridge are controlled, using regulation in accordance with the known prior art;

Figure 8:
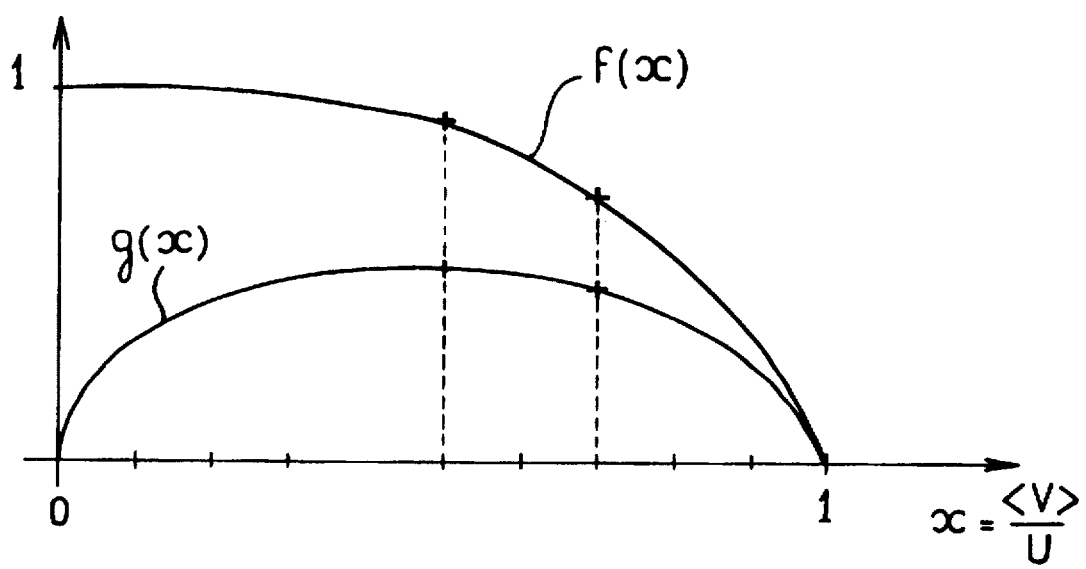

FIGS. 3a & 3b, 4a & 4b, 5a & 5b, 6a & 6b, and 7a & 7b show various control sequences in accordance with the invention; and FIG. 8 shows the rms current saving that the invention makes possible.

The H-bridge power supply circuit shown in FIG. 1 has four switches I1 to I4 connected in an H-configuration about a two-pole load M. The H-bridge is powered by a voltage source S via a filter circuit 1.

The switches I1 and I2 are mounted between ground and respective opposite ends of the load M, while the switches I3 and I4 are mounted between a common node N and the ends of the load M connected respectively to the switch I1 and to the switch I2.

The filter circuit 1 comprises a capacitor C connected between the node N and ground, together with an inductor L connected between the node N and the voltage source S.

The switches I1 to I4 are MOS type transistors. They are controlled by a control unit $U_c$ in the manner described below.

Free-wheel diodes D1 to D4 are connected in parallel with the switches I1 to I4 in the manner known to the person skilled in the art.

Advantageously, the switches I1 and I3 (and similarly I2 and I4) are controlled in opposition to restrict losses via the free-wheel diodes. They must not overlap in order to avoid short circuits.

Generally, in prior art regulation methods, the switches I1 and I4 (or I2 and I3, as the case may be) have been controlled so as to be opened or closed simultaneously.

This is shown in FIGS. 2a & 2b where a conventional control sequence for the switches I1 and I2 is shown.

The current flowing through the load M thus takes up in alternation during a cycle both the value i and the value –i, where i is a peak current value.

Pulse width modulation then consists, at a given cycle frequency, in servo-controlling the ON times $T_{01}$ and $T_{02}$ of the various switches as a function of an error signal concerning operation of the load.

The invention proposes a control sequence of the type shown in FIGS. 3a & 3b et seq., in which the durations of the various control states are selected so as to minimize the rms current flowing through the capacitor C.

In the text below, U designates the battery voltage, <V> the mean voltage that it is desired to apply to the load M, i the peak current that is applied to the load M, and I the instantaneous current flowing through the load M.

The terms $r_1$, $r_2$, and $r_3$ are also used to designate the duty ratios corresponding to the various possible commands that can be given to the motor M via the H-bridge:

$r_1$ corresponds to cycle portions during which the switches I1 and I4 are open (off) while the switches I2 and I3 are closed (on).

During these cycle portions, the instantaneous current I is equal to i, and the rms current flowing through the capacitor C is given by:

$$\Delta I_1 = (1 - <V>/U)i$$

$r_2$ corresponds to cycle portions during which the switches I3 and I4 are open (or closed as the case may be), while the switches I1 and I2 are closed (or open as the case may be).

During these cycle portions, the instantaneous current I is zero an the rms current flowing through the capacitor C is given by:

$$\Delta I_2 = (<V>/U)i$$

$r_3$ corresponds to portions of the cycle during which the switches I2 and I3 are open while the switches I1 and I4 are closed.

During these cycle portions, the instantaneous current I is equal to $-i$, and the rms current flowing through the capacitor C is given by:

$$\Delta I_3 = -(1+<V>/U)i$$

Given that the duty ratios $r_1$, $r_2$, and $r_3$ satisfy:

$$r_1 + r_2 + r_3 = 1$$

and also that $$<V> = r_1 U - r_3 U$$

it can be shown that the rms current flowing through the capacitor is:

$$i_{Crms} = \sqrt{r_1(\Delta I_1)^2 + r_2(\Delta I_2)^2 + r_3(\Delta I_3)^2}$$
$$= \sqrt{(2r_1 - <V>/U - (<V>/U)^2)i^2}$$

It is also known that the quantity $r_1 - <V>/U$ which is equal to $r_3$ must be positive.

Consequently, the rms current flowing through the capacitor C is at a minimum when $r_1 = <V>/U$, $r_3 = 0$, $r_2 = 1 - <V>/U$ if $<V>$ is positive
$r_1 = 0$, $r_3 = -<V>/U$, $r_2 = 1 + <V>/U$ if $<V>$ is negative.

Consequently, in both cases, the duty ratio of the cycle portion(s) during which the current I is zero, is equal to $1 - |<V>/U|$. The current I takes on a peak value ($i$ or $-i$) of constant sign during the remainder of the cycle.

FIGS. 3a & 3b and 4a & 4b show two possible control cycles in which $<V>/U$ is equal to 0.1.

In both cases, the cycle has a 10% phase corresponding to the duty ratio $r_1$, during which the switches I1 and I4 are open and the switches I2 and I3 are closed.

During the remainder of the cycle, the switches I1 to I4 are in the state which corresponds to duty ratio $r_2$, i.e. the switches I3 and I4 are:

either open while the switches I1 and I2 are closed;
or closed while the switches I1 and I2 are open.

FIGS. 5a & 5b show a sequence for operation at $<V>/U=0$.

In this control sequence, the switches I3 and I4 are open for half the cycle and closed for the other half.

It will be observed that such a sequence makes it possible to balance the power flowing through the various switches I1 to I4.

More generally, for a given value $<V>/U$, the following control sequence makes it possible to achieve substantially balanced operation of the H-bridge:

during a first stage corresponding to a fraction of the cycle equal to ½(1−|<V>/U|), both of the switches I1 and I2 of the H-bridge which are connected to ground are closed (or open as the case may be), while the other two switches I3 and I4 are open (or closed as the case may be);

then the switches are actuated by the control unit $U_c$ so that the current flowing through the load M takes its peak value ($i$ or $-i$) during a cycle fraction equal to $|<V>/U|$; and finally both switches I1 and I2 are open (or closed as the case may be) during a cycle fraction equal to ½(1−|<V>/U|).

Such a sequence is shown in FIGS. 6a & 6b for $<V>/U=0.2$.

The switch I3 is open during a first portion of the cycle corresponding to a 60% fraction thereof, and is closed during the remainder of the cycle.

The switch I4 is open over the first portion corresponding to a 40% fraction of the cycle and is closed for the remainder of the cycle.

Consequently, over one cycle, the operation corresponding to duty ratio $r_2$ is distributed in balanced manner on either side of a portion corresponding to 20% of the cycle during which operation corresponds to that of duty ratio $r_1$.

The control sequence illustrated in FIGS. 7a & 7b provides balanced operation with $<V>/U=-0.4$.

The switches I1 to I4 are in their states corresponding to duty ratio $r_3$ over a portion corresponding to 40% of the cycle. On either side of this portion, they are respectively in one and the other of their states corresponding to stage $r_2$ during 30% fractions of the cycle.

In all of the cases described above, the rms current flowing through the capacitors is:

$$i_{Crms} = \sqrt{(<V>/U)(1-<V>/U)^2 i^2}$$

whereas in conventional operation, as shown in FIGS. 2a & 2b, the rms current flowing through the capacitor is:

$$i_{Crms} = \sqrt{[1-(<V>/U)^2]i^2}$$

Consequently, when operating in the manner proposed by the invention, the rms current flowing through the capacitor C is always less than that obtained in conventional operation.

This is shown in FIG. 8 on which the following curves are plotted:

$$f(x) = \sqrt{1-x}$$

and $$g(x) = \sqrt{x(1-x)}$$

For example, assuming that $i = i_0 < V>/U$, then in conventional control, the rms current is at a maximum for $<V>/U = 1/\sqrt{2}$, in which case it is equal to 0.5 $i_0$.

When using treatment of the type proposed by the invention, the current is at its maximum when $<V>/U=¾$, in which case it takes on the value 0.33 $i_0$.

Consequently, with a control sequence of the type described above, the capacitor C can be dimensioned to withstand a maximum rms current of 0.33 $i_0$ instead of 0.5 $i_0$.

I claim:

1. A method of controlling an H-bridge of switches (I1 to I4) for regulating a load by pulse width modulation, said bridge being powered by a DC voltage source (S), smoothing capacitive means (C) being connected between the ends of said bridge, and the sequences whereby the switches (I1 to I4) of said bridge are actuated being selected to minimize the rms voltage flowing through said capacitive means (C), the method being characterized in that during a cycle, the current takes a peak value during a continuous portion corresponding to a cycle fraction equal to |<V>/U|, where <V> is the mean voltage applied to the load and U is the voltage of the DC voltage source, said portion being preceded by a cycle portion corresponding to a cycle fraction equal to ½(1−|<V>/U|) during which the two switches (I1, I2) of the H-bridge which are connected to ground are closed (or open as the case may be), and followed by a cycle portion likewise corresponding to a cycle fraction equal to ½(1−|<V>/U|) during which the two switches (I1, I2) of the H-bridge which are connected to ground are open (or closed as the case may be).

2. A circuit for powering a load, the circuit comprising a bridge of switches (I1 to I4), a DC voltage source (S) feeding said bridge, capacitive means (C) connected between the ends of said bridge, and a control unit ($U_c$) which actuates the switches (I1 to I4) of said bridge so as to regulate the load (M, $M_T$) by pulse width modulation, the circuit being characterized in that the control unit ($U_c$) actuates the switches (I1 to I4) of said bridge by applying control sequences of a method according to claim 1.

3. A power supply circuit for an electric motor in a motor vehicle, characterized in that it is constituted by a circuit according to claim 2.

* * * * *